United States Patent [19]
Jacobson et al.

[11] Patent Number: 5,615,352
[45] Date of Patent: Mar. 25, 1997

[54] METHODS FOR ADDING STORAGE DISKS TO A HIERARCHIC DISK ARRAY WHILE MAINTAINING DATA AVAILABILITY

[75] Inventors: Michael B. Jacobson; Douglas L. Voigt, both of Boise; Theresa A. Burkes, Meridian; Bryan Diamond, Boise, all of Id.

[73] Assignee: Hewlett-Packard Company, Palo Alto, Calif.

[21] Appl. No.: 319,385

[22] Filed: Oct. 5, 1994

[51] Int. Cl.$^6$ ...................................................... G06F 12/16
[52] U.S. Cl. ........................................ 395/441; 395/182.04
[58] Field of Search ...................................... 395/441, 488, 395/489, 497.04, 182.03, 182.04, 182.05

[56] References Cited

U.S. PATENT DOCUMENTS

| | | | |
|---|---|---|---|
| 5,155,835 | 10/1992 | Belsan | 395/441 |
| 5,195,100 | 3/1993 | Katz et al. | 395/182.2 |
| 5,208,813 | 5/1993 | Stallmo | 395/182.05 |
| 5,237,658 | 8/1993 | Walker et al. | 395/858 |
| 5,258,984 | 11/1993 | Menon et al. | 395/182.05 |
| 5,278,838 | 1/1994 | Ng et al. | 395/182.04 |
| 5,287,462 | 2/1994 | Jibbe et al. | 395/856 |
| 5,289,418 | 2/1994 | Youngerth | 365/201 |
| 5,297,258 | 3/1994 | Hale et al. | 395/441 |
| 5,392,244 | 2/1995 | Jacobson et al. | 395/441 |
| 5,479,653 | 12/1995 | Jones | 395/182.03 |
| 5,485,571 | 1/1996 | Menon | 395/182.05 |
| 5,502,836 | 3/1996 | Hale et al. | 395/497.01 |
| 5,519,844 | 5/1996 | Stallmo | 395/441 |

OTHER PUBLICATIONS

Mogi, Kazuhiko and Kitsuregawa, Masaru, "Dynamic Parity Stripe Reorganization for RAID5 Disk Arrays", Parallel and Distributed Information Systems, 1994 Int'l. Conference, pp. 17–26.

Primary Examiner—Tod R. Swann
Assistant Examiner—Keith W. Saunders

[57] ABSTRACT

A method is described for enlarging the storage capacity of a hierarchical disk array data storage system which stores data according to different levels of redundancy, or RAID levels. The method includes first mapping the physical storage space into a first virtual storage space having a plurality of RAID areas that extend across multiple storage disks in the disk array and comprise multiple stripes of segments from each storage disk. The first virtual storage space is mapped into a second virtual storage space having multiple virtual blocks. To enlarge storage capacity, one or more storage disks are added to the hierarchic disk array. To assimilate the new storage capacity, data in a selected existing RAID area is moved to another area on the disk array of equal or greater storage capacity. The mapping of the second virtual storage space to the first is updated to reflect the data movement. The physical storage space corresponding to the selected RAID area is then remapped into an expanded RAID area which spans across all storage disks, including the new disks. The process is repeated until all RAID areas in the hierarchic disk array have been expanded to include regions on the new storage disks. The capacity available to the second virtual storage space is modified to reflect the enlarged storage capacity. According to this method, data remains available to the user at all times during the enlargement process.

8 Claims, 9 Drawing Sheets

DISKS

| 0 | 1 | 2 | 3 | STRIPE NUMBER |
|---|---|---|---|---|
| 0 | 0' | 1 | 1' | 0 |
| 2 | 2' | 3 | 3' | 1 |
| 4 | 4' | 5 | 5' | 2 |
| 6 | 6' | 7 | 7' | 3 |
| * | * | * | * | * |
| * | * | * | * | * |
| * | * | * | * | * |
| T-1 | T-1' | T | T' | S |

Fig. 2

DISKS

| 0 | 1 | 2 | 3 | STRIPE NUMBER |
|---|---|---|---|---|
| 0 | 1 | 2 | P | 0 |
| 3 | 4 | P | 5 | 1 |
| 6 | P | 7 | 8 | 2 |
| P | 9 | 10 | 11 | 3 |
| * | * | * | * | * |
| * | * | * | * | * |
| * | * | * | * | * |
| P | R-2 | R-1 | R | Q |

Fig. 3

DISKS

| 0 | 1 | 2 | 3 | NEW 4 | |
|---|---|---|---|---|---|
| 0 | 1 | 2 | P | N | GROUP A |
| ③ | 4 | P | 5 | N | GROUP B |
| 6 | P | 7 | 8 | N | |
| P | 9 | 10 | 11 | N | |
| 12 | 13 | 14 | P | N | |
| 15 | 16 | P | 17 | N | |

Fig. 7

DISKS

| 0 | 1 | 2 | 3 | NEW 4 | |
|---|---|---|---|---|---|
| 0 | 1 | 2 | 3 | P | |
| V | ④ | P | ⑤ | N | GROUP A |
| ⑥ | P | ⑦ | 8 | N | GROUP B |
| P | 9 | 10 | 11 | N | |
| 12 | 13 | 14 | P | N | |
| 15 | 16 | P | 17 | N | |

Fig. 8

DISKS

| 0 | 1 | 2 | 3 | NEW 4 | |
|---|---|---|---|---|---|
| 0 | 1 | 2 | 3 | P | |
| 4 | 5 | 6 | P | 7 | |
| V | P | V | 8 | N | GROUP A |
| P | 9 | 10 | 11 | N | GROUP B |
| 12 | 13 | 14 | P | N | |
| 15 | 16 | P | 17 | N | |

FIG. 9

DISKS

| 0 | 1 | 2 | 3 | NEW 4 | |
|---|---|---|---|---|---|
| 0 | 1 | 2 | 3 | P | |
| 4 | 5 | 6 | P | 7 | |
| 8 | 9 | P | 10 | 11 | |
| P | V | V | V | N | GROUP A |
| 12 | 13 | 14 | P | N | GROUP B |
| 15 | 16 | P | 17 | N | |

FIG. 10

DISKS
| 0 | 1 | 2 | 3 | NEW 4 | |
|---|---|---|---|---|---|
| 0 | 1 | 2 | 3 | P | |
| 4 | 5 | 6 | P | 7 | |
| 8 | 9 | P | 10 | 11 | |
| 12 | P | 13 | 14 | 15 | |
| P | 16 | 17 | 18 | 19 | |
| 20 | 21 | 22 | 23 | P | |
| V | P | V | V | N | GROUP A |
| P | V | V | V | N | GAP |
| 24 | 25 | 26 | P | N | GROUP B |
| 27 | 28 | P | 29 | N | |
| 30 | P | 31 | 32 | N | |
DISKS
| 0 | 1 | 2 | 3 | NEW 4 | |
|---|---|---|---|---|---|
| • | • | • | • | • | |
| • | • | • | • | • | |
| G-3 | G-2 | G-1 | P | G | |
| E | E | E | E | E | GROUP A |
| • | • | • | • | • | ↑ |
| • | • | • | • | • | |
| E | E | E | E | E | GAP |
| • | • | • | • | • | |
| • | • | • | • | • | ↓ |
| V | H | H+1 | P | N | GROUP B |
| H+2 | H+3 | P | H+4 | N | |
| • | • | • | • | • | |
| • | • | • | • | • | |

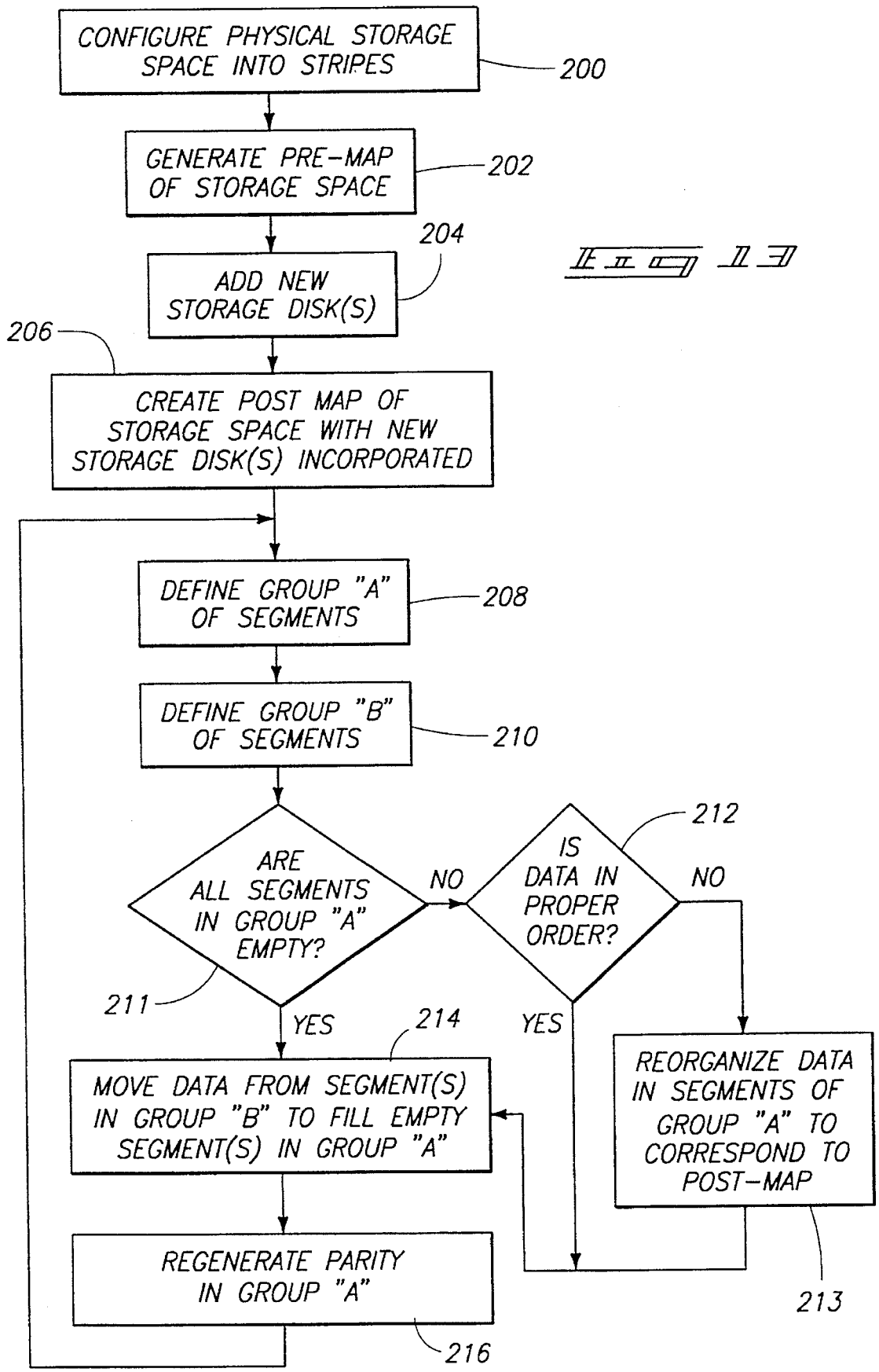

METHODS FOR ADDING STORAGE DISKS TO A HIERARCHIC DISK ARRAY WHILE MAINTAINING DATA AVAILABILITY

FIELD OF THE INVENTION

This invention relates to data storage systems, such as a hierarchic disk array data storage systems, and methods for adding disks to such systems.

BACKGROUND OF THE INVENTION

Computer systems are constantly improving in terms of speed, reliability, and processing capability. As a result, computers are able to handle more complex and sophisticated applications. As computers improve, performance demands placed on mass storage and input/output (I/O) devices increase. There is a continuing need to design mass storage systems that keep pace in terms of performance with evolving computer systems.

This invention particularly concerns the mass storage systems of the disk array type. Disk array data storage system have multiple storage disk drive devices which are arranged and coordinated to form a single mass storage system. There are three primary design criteria for mass storage systems: cost, performance, and availability. It is most desirable to produce memory devices that have a low cost per megabyte, a high input/output performance, and high data availability. "Availability" is the ability to access data stored in the storage system and the ability to insure continued operation in the event of some failure. Typically, data availability is provided through the use of redundancy wherein data, or relationships among data, are stored in multiple locations.

There are two common methods of storing redundant data. According to the first or "mirror" method, data is duplicated and stored in s two separate areas of the storage system. For example, in a disk array, the identical data is provided on two separate disks in the disk array. The mirror method has the advantages of high performance and high data availability due to the duplex storing technique. However, the mirror method is also relatively expensive as it effectively doubles the cost of storing data.

In the second or "parity" method, a portion of the storage area is used to store redundant data, but the size of the redundant storage area is less than the remaining storage space used to store the original data. For example, in a disk array having five disks, four disks might be used to store data with the fifth disk being dedicated to storing redundant data. The parity method is advantageous because it is less costly than the mirror method, but it also has lower performance and availability characteristics in comparison to the mirror method.

One problem encountered in the design of disk array data storage systems concerns the task of adding more storage disk drive devices to increase the storage capacity of the disk array. Conventional disk arrays require the following lengthy process. First, the data currently stored on the disk array is copied to an entirely separate storage device (such as a reel-to-reel tape storage system). Next, the new storage disks are added to the disk array. The entire disk array is then reconfigured to incorporate the new storage disks. Finally, the data is copied from the separate storage device back to the newly configured disk array. Unfortunately, the disk array is not accessible during this process and the data, which has been temporarily transferred to a separate backup system, is unavailable.

SUMMARY OF THE INVENTION

The present invention provides methods for enlarging storage capacity in a data storage system by adding more storage disks, yet still maintaining data availability. According to one method, the physical storage space of the disk array is configured into multiple stripes for storing a predetermined amount of data. The stripes extend across multiple storage disks in the disk array, and are made up of one or more equal sized segments from each storage disk in the disk array. When more storage disks are added, data from one stripe is moved to a another portion of the physical storage space. The physical storage space containing the stripe is then reconfigured into an expanded stripe for storing data. This expanded stripe spans across all storage disks, including the new additional storage disks. The expanded stripe is then ready to receive new data. This process is continued stripe-by-stripe until all stripes have been configured to include the new disks. While the stripe is being expanded, the data storage system does not allocate any virtual blocks within the selected stripe.

According to another method for enlarging storage capacity in a data storage system, a pre-map of the stripe configuration of the physical storage space is initially provided. When one or more additional storage disks are added to the disk array, a post-map indicative of a new configuration of the physical storage space is created. This post-map takes into account the additional storage disks. A group A of segments is then defined to include at least one expanded stripe having a segment from the individual storage disks and a segment from the new additional storage disk. A group B of segments is defined to include segments not found in group A.

The data in the segments of group A is reorganized from a first data arrangement according to the pre-map to a second data first arrangement according to the post-map. Following this reorganization, the group A of segments will have at least one empty segment due to the increased storage area of adding at least one additional disk. Accordingly, data is moved from at least one segment in group B to fill the empty segment(s) in group A. This process is continued step-by-step until all stripes have been configured to include the new disks. Any conflicts concerning data access to groups A and B by the user and data movement during migration that arise during the process are resolved so that data remains available at all times.

This invention can also be uniquely tailored for use in hierarchical disk array data storage systems which store data according to different levels of redundancy, or RAID levels. This method includes first mapping the physical storage space into a first virtual storage space having a plurality of RAID areas. Each RAID area can be configured as either a first or second RAID area type where a first RAID area type holds data according to a first RAID level (such as RAID level 1 or mirror redundancy) and a second RAID area type holds data according to a second RAID level (such as RAID level 5 or parity redundancy). The RAID areas extend across multiple storage disks in the disk array and comprise equal sized storage regions from each storage disk. The first virtual storage space can then be mapped into a second virtual storage space having multiple virtual blocks. This second virtual storage space is the view of storage defined by and presented to the user or host.

In this case, when one or more storage disks are added to the hierarchic disk array, data stored in a selected RAID area is moved to another area of equal or greater storage capacity. The mapping of first to second virtual storage spaces is updated to reflect the data movement. The physical storage space corresponding to the selected RAID area is then remapped into an expanded RAID area which spans across all storage disks, including the new disks. This process is repeated until all RAID areas in the hierarchic disk array have been expanded to include regions on the new storage disks. The mapping of the second virtual storage space to first is continuously modified to reflect the expansion of the RAID areas within the virtual storage space.

The data remains available during this capacity enlargement process to assimilate the new disk. The data remains resident and accessible on the disk array and is not transferred to another separate storage device. Only the data in the process of being remapped as a result of a move is suspended from access, and then only temporarily. The methods of this invention therefore effectively ensure that the data is available to the user at all times.

DESCRIPTION OF THE DRAWINGS

Preferred embodiments of the invention are described below with reference to the following accompanying drawings depicting examples embodying the best mode for practicing the invention.

FIG. 2 is a diagrammatic illustration of storage space on multiple storage disks and shows data storage according to RAID Level 1.

FIG. 3 is a diagrammatic illustration of storage space on multiple storage disks and shows data storage according to RAID Level 5.

FIG. 7 is a diagrammatic illustration of storage space on multiple storage disks and demonstrates an initial step in another preferred method of this invention concerning reorganizing and packing data within a stripe to simultaneously enlarge the stripe to include a new segment from a new additional disk.

FIG. 8 shows the storage space of FIG. 7, but demonstrates a step subsequent to that shown in FIG. 7.

FIG. 9 shows the storage space of FIG. 7, but demonstrates a step subsequent to that shown in FIG. 8.

FIG. 10 shows the storage space of FIG. 7, but demonstrates a step subsequent to that shown in FIG. 9.

FIG. 11 shows the storage space of FIG. 7, but demonstrates a step subsequent to that shown in FIG. 10.

FIG. 12 shows the storage space of FIG. 7, and demonstrates the general format of continuing steps taken subsequent to the step shown in FIG. 11.

FIG. 13 is a flow diagram showing the methodical steps of enlarging storage capacity by adding new disks as illustrated in FIGS. 7–12.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
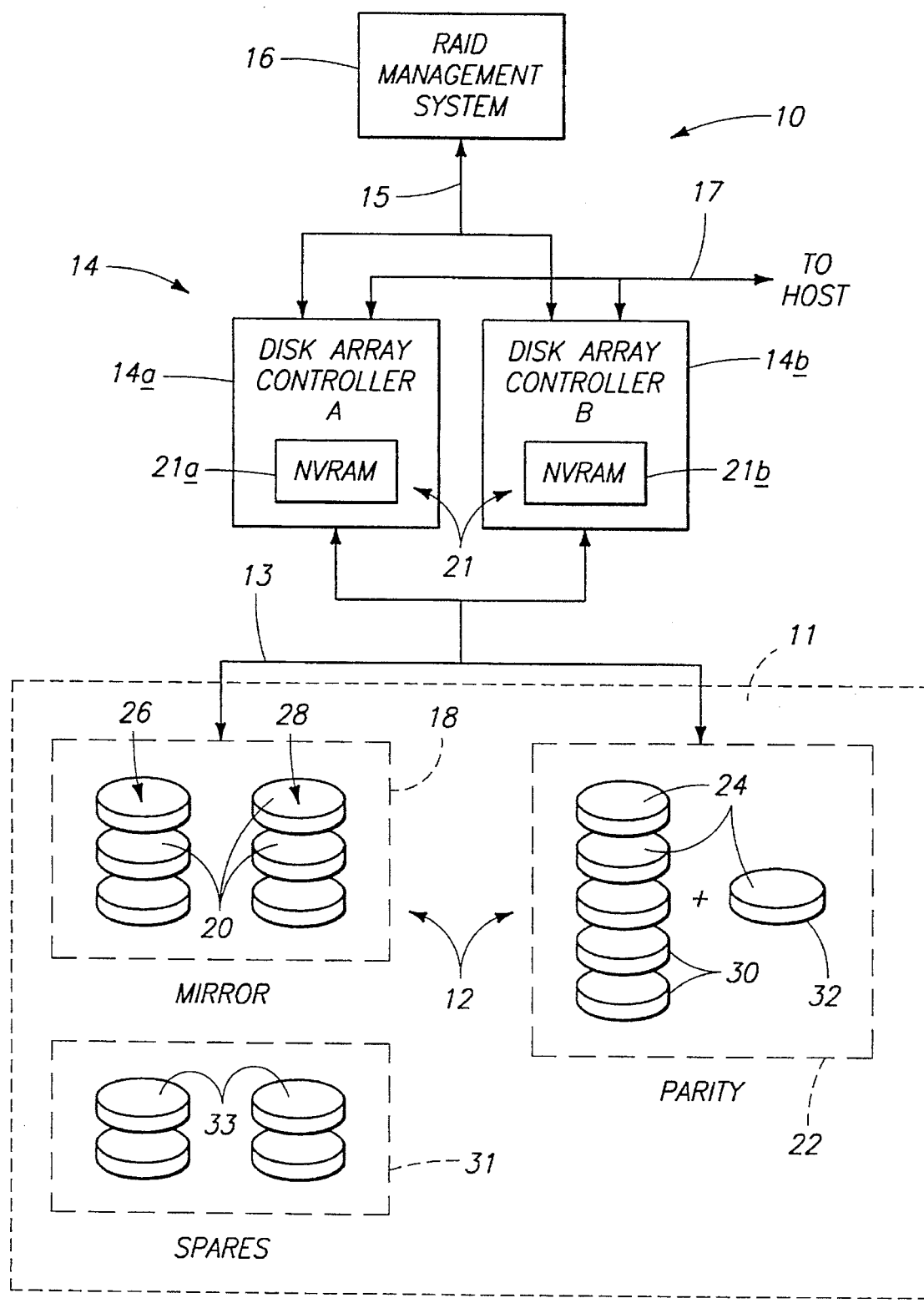
FIG. 1 is a diagrammatic block diagram of a disk array data storage system according to this invention.

FIG. 1 shows a data storage system 10 constructed according to this invention. Preferably, data storage system 10 is a disk array data storage system which includes a hierarchic disk array 11 having a plurality of storage disks 12, a disk array controller 14 coupled to the disk array 11 to coordinate data transfer to and from the storage disks 12, and a RAID management system 16.

For purposes of this disclosure, a "disk" is any non-volatile, randomly accessible, rewritable mass storage device which has the ability of detecting its own storage failures. It includes both rotating magnetic and optical disks and solid-state disks, or non-volatile electronic storage elements (such as PROMs, EPROMs, and EEPROMs). The term "disk array" is a collection of disks, the hardware required to connect them to one or more host computers, and management software used to control the operation of the physical disks and present them as one or more virtual disks to the host operating environment. A "virtual disk" is an abstract entity realized in the disk array by the management software.

The term "RAID" (Redundant Array of Independent Disks) means a disk array in which part of the physical storage capacity is used to store redundant information about user data stored on the remainder of the storage capacity. The redundant information enables regeneration of user data in the event that one of the array's member disks or the access path to it fails. A more detailed discussion of RAID systems is found in a book entitled, *The RAIDBook: A Source Book for RAID Technology*, published Jun. 9, 1993, by the RAID Advisory Board, Lino Lakes, Minn.

Disk array controller 14 is coupled to disk array 11 via one or more interface buses 13, such as a small computer system interface (SCSI). RAID management system 16 is operatively coupled to disk array controller 14 via an interface protocol 15. Data memory system 10 is also coupled to a host computer (not shown) via an I/O interface bus 17. RAID management system 16 can be embodied as a separate component, or configured within disk array controller 14 or within the host computer to provide a data manager means for controlling disk storage and reliability levels, and for transferring data among various reliability storage levels. These reliability storage levels are preferably mirror or parity redundancy levels as described below, but can also include a reliability storage level with no redundancy at all.

The disk array controller 14 is preferably implemented as a dual controller consisting of disk array controller A 14a and disk array controller B 14b. Dual controllers 14a and 14b enhance reliability by providing continuous backup and redundancy in the event that one controller becomes inoperable. The methods of this invention can be practiced, however, with a single controller or other architectures.

The hierarchic disk array 11 can be characterizable as different storage spaces, including its physical storage space and one or more virtual storage spaces. These various views of storage are related through mapping techniques. For example, the physical storage space of the disk array can be mapped into a virtual storage space which delineates storage areas according to the various data reliability levels. Some areas within the virtual storage space can be allocated for a first s reliability storage level, such as mirror or RAID level 1, and other areas can be allocated for a second reliability storage level, such as parity or RAID level 5. The various mapping techniques and virtual spaces concerning RAID levels are described below in more detail.

Data storage system 10 includes a memory map store 21 that provides for persistent storage of the virtual mapping information used to map different storage spaces into one another. The memory map store is external to the disk array, and preferably resident in the disk array controller 14. The memory mapping information can be continually or periodically updated by the controller or RAID management system as the various mapping configurations among the different views change.

Preferably, the memory map store 21 is embodied as two non-volatile RAMs (Random Access Memory) 21a and 21b which are located in respective controllers 14a and 14b. An example non-volatile RAM (NVRAM) is a battery-backed RAM. A battery-backed RAM uses energy from an independent battery source to maintain the data in the memory for a period of time in the event of power loss to the data storage system 10. One preferred construction is a self-refreshing, battery-backed DRAM (Dynamic RAM).

The dual NVRAMs 21a and 21b provide for redundant storage of the memory mapping information. The virtual mapping information is duplicated and stored in both NVRAMs 21a and 21b according to mirror redundancy techniques. In this manner, NVRAM 21a can be dedicated to storing the original mapping information and NVRAM 21b can be dedicated to storing the redundant mapping information. In an alternative construction, a mirrored memory map store can be configured using a single non-volatile RAM with sufficient space to store the data in duplicate.

As shown in FIG. 1, disk array 11 has multiple storage disk drive devices 12. Example sizes of these storage disks are one to three Gigabytes. The storage disks can be independently connected or disconnected to mechanical bays that provide interfacing with SCSI bus 13. In one implementation, the data storage system is designed with twelve active mechanical bays. Four SCSI buses are used to interface these bays with disk array controller 14 (i.e., one bus per 3 mechanical bays). If the active bays are fully loaded, the data storage system has an example combined capacity of 12–36 Gigabytes. Disk array controller 14 recognizes storage disks 12 regardless into which bay they are plugged. The data storage system 10 is designed to permit "hot plug" of additional disks into available mechanical bays in the disk array while the disk array is in operation. The addition of new storage disk devices is described below in more detail with reference to FIGS. 5–13.

The storage disks 12 in disk array 11 can be conceptualized, for purposes of explanation, as being arranged in a mirror group 18 of multiple disks 20 and a parity group 22 of multiple disks 24. Mirror group 18 represents a first memory location or RAID area of the disk array which stores data according to a first or mirror redundancy level. This mirror redundancy level is also considered a RAID Level 1. RAID Level 1, or disk mirroring, offers the highest data reliability by providing one-to-one protection in that every bit of data is duplicated and stored within the data storage system. The mirror redundancy is diagrammatically represented by the three pairs of disks 20 in FIG. 1. Original data can be stored on a first set of disks 26 while duplicative, redundant data is stored on the paired second set of disks 28.

FIG. 2 illustrates the storage of data according to RAID Level 1 in more detail. The vertical columns represent individual disks, of which disks 0, 1, 2, and 3 are illustrated. The physical storage space contained in this disk array of four disks can be configured into multiple stripes, as represented by the horizontal rows. A "stripe" extends across the storage disks and is comprised of numerous, equal sized segments of storage space where one segment is associated with each disk in the array. That is, a segment is the portion of a stripe that resides on a single disk. Each stripe holds a predetermined amount of data which is distributed across the storage disks. Some segments of a stripe are used for original data while other segments are used for redundant data.

In this example of mirror redundancy (RAID Level 1), data stored on disk 0 in segment 0 of stripe 0 is duplicated and stored on disk 1 in segment 0' of stripe 0. Similarly, data stored on disk 2 in segment 5 of stripe 2 is mirrored into segment 5' of stripe 2 on disk 3. In this manner, each piece of data is duplicated and stored on the disks. The redundancy layout of FIG. 2 is provided for explanation purposes. The redundant data need not be placed neatly in the same stripe as is shown. For example, data stored on disk 0 in segment 2 of stripe 1 could be duplicated and placed on disk 3 in segment T' of stripe S.

With reference again to FIG. 1, the parity group 22 of disks 24 represent a second memory location or RAID area in which data is stored according to a second redundancy level, such as RAID Level 5. In this explanatory illustration of six disks, original data is stored on the five disks 30 and redundant "parity" data is stored on the sixth disk 32.

FIG. 3 shows a parity RAID area layout in more detail. Similar to the mirror RAID area layout of FIG. 2, the physical storage space of disks 0, 1, 2, 3 can be configured into multiple equal sized stripes. In this illustrated example, data is stored according to RAID Level 5 and the redundant data stored in the segments is referenced by letter P. The redundant P segments store the parity of the other segments in the stripe. For example, in stripe 0, the redundant P segment on disk 3 stores the parity of disks 0, 1, and 2. The parity for each stripe is computed by some function, such as an exclusive OR function which is represented by the symbol "⊕". The parities for the first four stripes (with the subscript numeral representing the corresponding stripe) are as follows:

$P_0$ = Segment 0 ⊕ Segment 1 ⊕ Segment 2
   = Disk 0 ⊕ Disk 1 ⊕ Disk 2
$P_1$ = Segment 3 ⊕ Segment 4 ⊕ Segment 5
   = Disk 0 ⊕ Disk 1 ⊕ Disk 3
$P_2$ = Segment 6 ⊕ Segment 7 ⊕ Segment 8
   = Disk 0 ⊕ Disk 2 ⊕ Disk 3
$P_3$ = Segment 9 ⊕ Segment 10 ⊕ Segment 11
   = Disk 1 ⊕ Disk 2 ⊕ Disk 3

Parity redundancy allows regeneration of data which becomes unavailable on one of the disks. For example, if the data in segment 5 becomes unavailable, its contents can be ascertained from segments 3 and 4 and the parity data in segment P. Parity storage is less expensive than mirror storage, but is also less reliable and has a lower performance.

The disk arrangement of FIG. 1 is provided for conceptual purposes. In practice, the disk array 11 would simply have a plurality of disks 12 which are capable of storing data according to mirror and parity redundancy. Among the available storage space provided by all disks 12, a portion of that storage space would be allocated for mirror redundancy and another portion would be allocated for parity redundancy. Preferably, disks 12 are configured to contain plural, equal sized storage regions (referenced as numeral 35 in FIG. 4), wherein individual regions have multiple segments. The regions are grouped together to form RAID areas in one virtual view of the storage space. Additionally, another (host-defined) view of storage space is presented to is the user or host so that the RAID areas and data redundancy storing techniques are transparent to the user or host. These features are discussed below in more detail with reference to FIG. 4.

Data storage system 10 manages the "migration" of data between mirror and parity storage schemes. The management of both types of redundancy is coordinated by RAID management system 16 (FIG. 1). RAID management system 16 manages the two different types of RAID areas in the disk array as a memory hierarchy with the mirror RAID areas acting similar to a cache for the parity RAID areas. RAID management system 16 shifts, organizes, and otherwise manages the data between the mirror and parity RAID areas in accordance with a defined performance protocol. The process of moving data between the mirror and parity RAID areas is referred to as "migration".

Data storage system 10 tries to place the more performance-critical data in the mirror RAID areas since this affords the highest performance and reliability. The performance protocols implemented by RAID management system 16 includes one of two s preferred migration policies. According to the first migration policy, known as "access frequency", the most frequently accessed data on the hierarchic disk array is maintained in the mirror RAID area 18. Less frequently accessed data is maintained in the parity RAID area 22. According to a second migration policy, known as "access recency", the most recently accessed data is maintained in the mirror RAID area 18 while the less recently accessed data is stored in parity RAID area 22. Other performance protocols may be employed. Ideally, such protocols are defined based upon the specific computer application and the needs of the user.

Additionally, the RAID management system 16 automatically "tunes" the storage resources of a data storage system according to a function of two parameters: size of the physical storage capacity and size of the present amount of user data being stored in the data storage system. Initially, all data is stored in mirror RAID areas because this affords the highest performance and reliability. As more data is added to the data storage system, the data is migrated between mirror RAID areas and parity RAID areas to optimize performance and reliability. As the data storage system approaches full capacity, more and more data is migrated to parity RAID areas in an effort to meet all demands by the user while still providing reliability through redundancy. Accordingly, the data storage system of this invention affords maximum flexibility and adaptation. It does not require the user to select a specific storage regime, but instead can adapt to any demand placed on it by the user.

Figure 4:
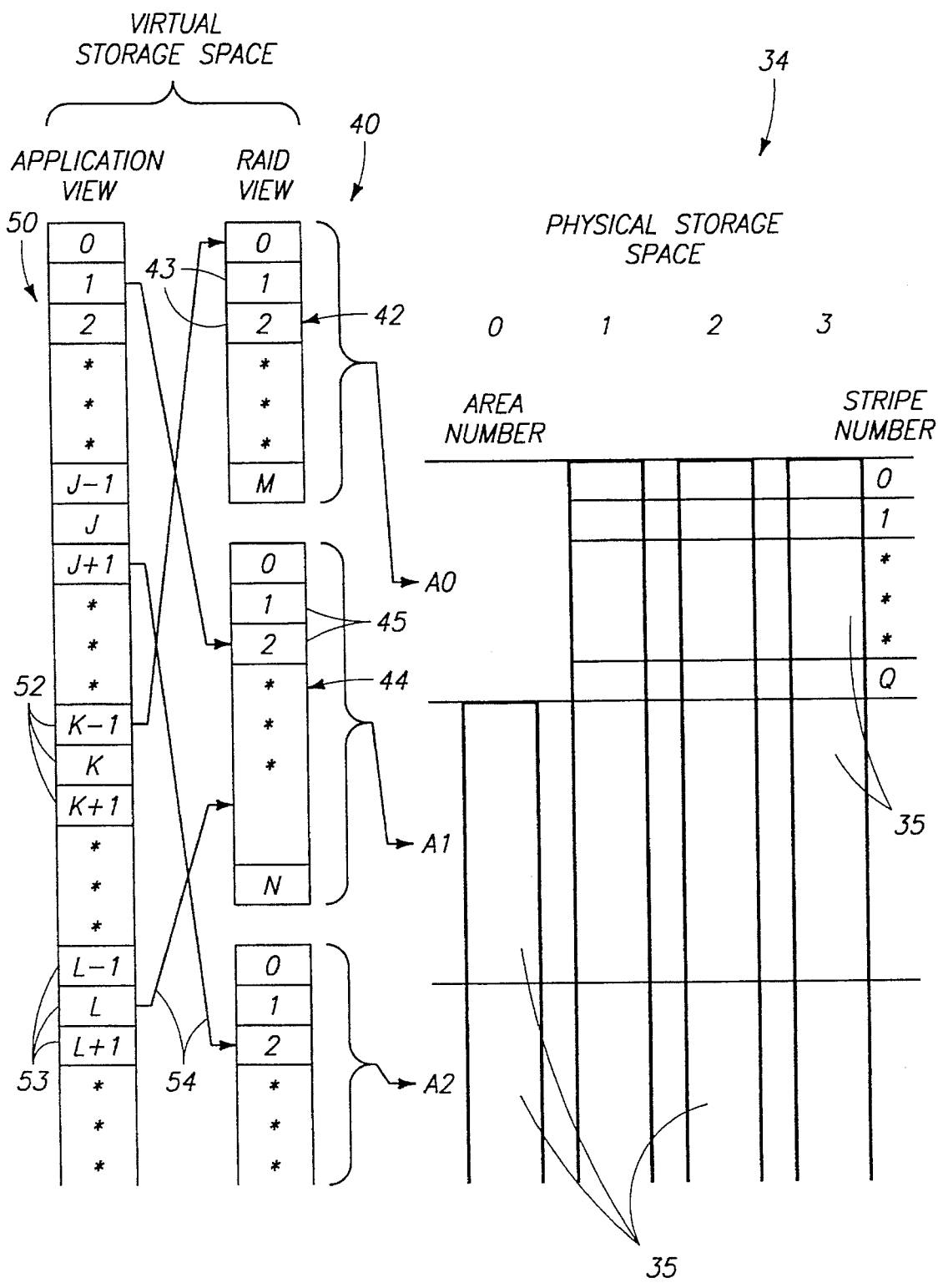
FIG. 4 is a diagrammatic illustration of a memory mapping arrangement of this invention where two virtual storage spaces are s mapped with respect to a physical storage space.

FIG. 4 illustrates a memory mapping of the available storage space of data storage system 10 as multiple tiers of mapped virtual storage space. Each vertically elongated rectangle in the diagram represents a view of the physical storage space. In this diagram, physical storage space 34 is referenced by two virtual storage views 40 and 50. Physical storage space 34 is represented by four disks (such as disks 12 in FIG. 1) referenced by numerals 0, 1, 2, and 3. The four rectangles associated with the disks represent a view of the physical storage space wherein disks 1, 2, and 3 have approximately equal storage capacity, and disk 0 has slightly less storage capacity. Example storage capacities for such disks are 1–3 Gigabytes. The storage space 34 is partitioned into areas A0, A1, A2, etc. Individual areas contain numerous stripes, such as stripes 0–Q in area A0. Individual areas also contain numerous regions 35. Regions 35 preferably consist of a selected number of uniform sized segments on every storage disk so that the regions are equal in size across the entire disk array. An example size of one region 35 is one Megabyte.

The storage space of the disks are mapped into a first, intermediate, RAID-level virtual view 40 of the physical storage space 34. This first virtual view is conceptually a set of RAID areas which can be mapped to a second application view that represents a contiguously addressable storage space. The physical configuration and RAID views of the storage space are hidden from the application view.

The RAID area storage space 40 is the view of storage that identifies the mirror and parity storage space. For instance, a RAID area 42 may represent a mirror RAID area of M allocation blocks 43 while RAID area 44 may represent a parity RAID area of N allocation blocks 45. The allocation blocks 43 and 45 are preferably equal sized, with an example size being 64 Kilobytes. These RAID areas relate to corresponding physical areas A0, A1, A2, etc., on the physical storage space 34. As an example, sixteen 64K allocation blocks 43 or 45 at the RAID virtual view can be mapped onto a single 1M region 35.

The mirror and parity RAID areas may or may not consume the entire storage space 34 of the disk array. Accordingly, during certain applications, there may be unused and undesignated storage space that does not correspond to a particular RAID area. However, such storage space can be converted into a mirror or parity RAID area. It is also noted that the RAID areas are shown as being mapped into contiguous areas on the disk array, where each region associated with a RAID area is located at the same physical address on each storage disk. The RAID areas may alternatively be mapped into non-contiguous areas on the disk array as well.

The storage space available in the RAID areas is mapped into a second, front end, application-level virtual view 50 which is a view of storage as defined by and presented to the user or host application program. When viewed by the user or host application program, the application-level virtual view 50 can represent a single large storage capacity indicative of the available storage space on storage disks 12. Virtual storage space 50 presents a view of a linear set of equal sized storage virtual blocks 52 and 53, referenced individually as 0, 1, 2, ... J-1, J, J+1, ..., L-1, L, L+1, ..., etc. Virtual blocks 52 and 53 are preferably the same size as the allocation blocks in RAID area 40, with an example size being 64 Kilobytes. The virtual block storage space 50 is represented by a table of references or pointers (as represented by arrows 54*) to allocation blocks in the view presented by RAID areas 40. Virtual blocks 52 and 53 at the application virtual view 50 are therefore associated with allocation blocks 43 and 45 at the RAID virtual view 40 via the pointers maintained in the virtual block table. There are at least two types of RAID areas that can be referenced from the virtual block table: mirror and parity.

The RAID management system 16 can dynamically alter the configuration of the RAID areas over the physical storage space. The number of RAID areas for each type may be increased or decreased depending upon the amount of user data being stored in the system and the size of the physical disk storage space. As a result, the mapping of the RAID areas in the RAID-level virtual view 40 onto the disks and the mapping of the front end virtual view 50 to RAID view 40 are generally in a state of change. The memory map store in NVRAMs 21a and 21b (FIG. 1) maintains the current mapping information used by RAID management system 16 to map the RAID areas onto the disks, as well as the information employed to map between the two virtual views. As the RAID management system dynamically alters the RAID level mappings, it also updates the mapping information in the memory map store to reflect the alterations.

The migration operation of memory system 10 will now be described with reference to FIGS. 1 and 4.

For purposes of continuing explanation, virtual blocks 53 of the application-level virtual storage space 50 reference associated allocation blocks 45 in parity RAID area 44 stored in area A1 of physical storage space 34. Such virtual blocks 53 are referred to as "parity virtual blocks" while the associated allocation blocks 45 are referred to as "parity allocation blocks". Similarly, virtual blocks 52 reference associated allocation blocks 43 in mirror RAID area 42 stored in area A0 of physical storage space 34. Such virtual blocks 52 are referred to herein as "mirror virtual blocks" while the associated allocation blocks 43 are referred to as "mirror allocation blocks".

In general, to migrate data from one RAID area to another, a virtual block associated with an allocation block of a first RAID level type (such as mirror or Level 1) is selected. Then, an unused allocation block representing a second RAID level type (such as parity or Level 5) is located. If an unused allocation block cannot be located, one is created. Data is next transferred from the allocation block previously associated with the selected virtual block to the unused allocation block which causes the data to undergo a redundancy level change. For example, data once stored according to mirror redundancy would now be stored according to parity redundancy, or vice versa. As a final step, the mapping 54 of the application-level virtual storage space 50 to the RAID-level virtual storage space 40 is modified and updated to reflect the is shift of data. The selected virtual block that was formerly associated with an allocation block of the first RAID level type now references via an updated pointer an allocation block of the second RAID level type which contains the migrated data. Any mapping change occurring during this transaction would be updated in memory map store 21.

The continuing discussion provides a more detailed explanation of migrating data between mirror and parity storage areas according to preferred methods and sequences of this invention. To migrate data from parity to mirror storage, the following sequence is employed:

1. The RAID management system locates an unused mirror allocation block 43 in a mirror RAID area 42.
2. If none can be found, the RAID management system creates a mirror allocation block (discussed below).
3. The RAID management system suspends new storage requests to the virtual block to be migrated.
4. The RAID management system waits until all active data storage requests to the virtual block are completed.
5. The data from the parity allocation block 45 associated with virtual block 53 is read into a temporary memory buffer.
6. The data is then written to the mirror allocation block 43 chosen in step 2.
7. The virtual block table is modified to reference the new location of the data in the mirror allocation block 43.
8. The suspended storage requests are resumed. According to the above procedure, a virtual block 53 in the application-level virtual view 50 migrated from parity to mirror storage. Relative to the intermediate virtual view 40, data has migrated from a parity allocation block 45 in parity RAID area 44 to a mirror allocation block 43 in mirror RAID area 42. In the physical storage space data has moved from area A1 to area A0.

If an unused mirror allocation block cannot be located (step 1 above), the RAID management system tries the following preferred sequence of three techniques. First, the RAID management system will try to locate an unused (and thus undesignated) RAID area, which can be converted to a mirror RAID area without violating the system threshold of unused RAID-level storage that is needed to guarantee that migration can always proceed. If this fails and the system has more than the reserved amount of unused RAID-level storage, the system migrates data within parity storage to collect unused parity allocation blocks into unused RAID areas. If this migration yields an unused RAID area that can be converted to a mirror RAID area as above, then the system converts it to a mirror RAID area. Otherwise, the system alternately migrates data from mirror to parity storage, packs mirror storage, and converts unused RAID-level storage to parity until the system increases unused RAID-level storage sufficiently for the location of an unused mirror allocation block or a conversion of an unused RAID area to a mirror RAID area. Since mirror allocation blocks occupy more physical storage space than parity allocation blocks, this last technique will result in a net increase in the amount of unused RAID-level storage.

The creation/conversion protocol used to locate and establish unused mirror allocation blocks is advantageous because it permits the RAID management system to selectively adjust the memory allocation between parity and mirror areas according to the amount of user data and the size of physical storage space. As data usage and storage capacity vary, the RAID management system employs one or more of the above three techniques to maximize the amount of data held in mirror storage.

The RAID management system attempts to avoid the situation in which a storage request must wait for the space-making sequence to yield an unused mirror allocation block by creating unused RAID areas during idle time. However, in some situations, storage requests may be suspended during the space-making sequence. The RAID management system configures the virtual block storage space in such a way that the virtual space will be smaller than the RAID view. This ensures that a free space equal to at least one RAID area is set aside for migration or other purposes. In this manner, the sequence of techniques will always yield an unused mirror allocation block.

To migrate data from mirror to parity storage, the following sequence is employed:

1. The RAID management system chooses a virtual block from 52 to migrate from mirror to parity storage according to a migration policy such as access recency or access frequency.
2. The RAID management system locates an unused parity allocation block 45 in a parity RAID area 44.
3. If such a block cannot be found, space reserved for migration is converted to a parity RAID area according to the above described creation techniques.
4. New storage requests to the virtual block to be migrated are suspended.

5. The RAID management system waits until all active storage requests to the virtual block are completed.

6. Data is read from the mirror allocation block 43 associated with virtual block 52 into a temporary memory buffer.

7. The data is written to the chosen parity allocation block 45.

8. The virtual block table is modified to reference the new location of the data in parity allocation block 45.

9. Data requests to the virtual block are resumed. The above two nine-step sequences provide examples of how the memory system of this invention can operate to migrate data between two different levels of redundancy.

Returning once again to FIG. 1, data storage system 10 further includes a set 31 of spare storage disks 33. The data storage system 10 is designed to permit "hot plug" of additional disks into available mechanical bays in the disk array while the disk array remains in operation. The data storage system is not powered down at this time. To enlarge the storage capacity of the data storage system, one or more spare disks 33 are simply plugged into available bays to interface with SCSI bus 13. The controller 14 will recognize the new disk(s) and begin the processes of this invention to assimilate the additional storage space into usable RAID areas.

Methods for enlarging the storage capacity by hot plugging one or more storage disks will now be described with reference to FIGS. 5–13. The methods are preferably performed in background during idle times of the data storage system.

Figure 5:
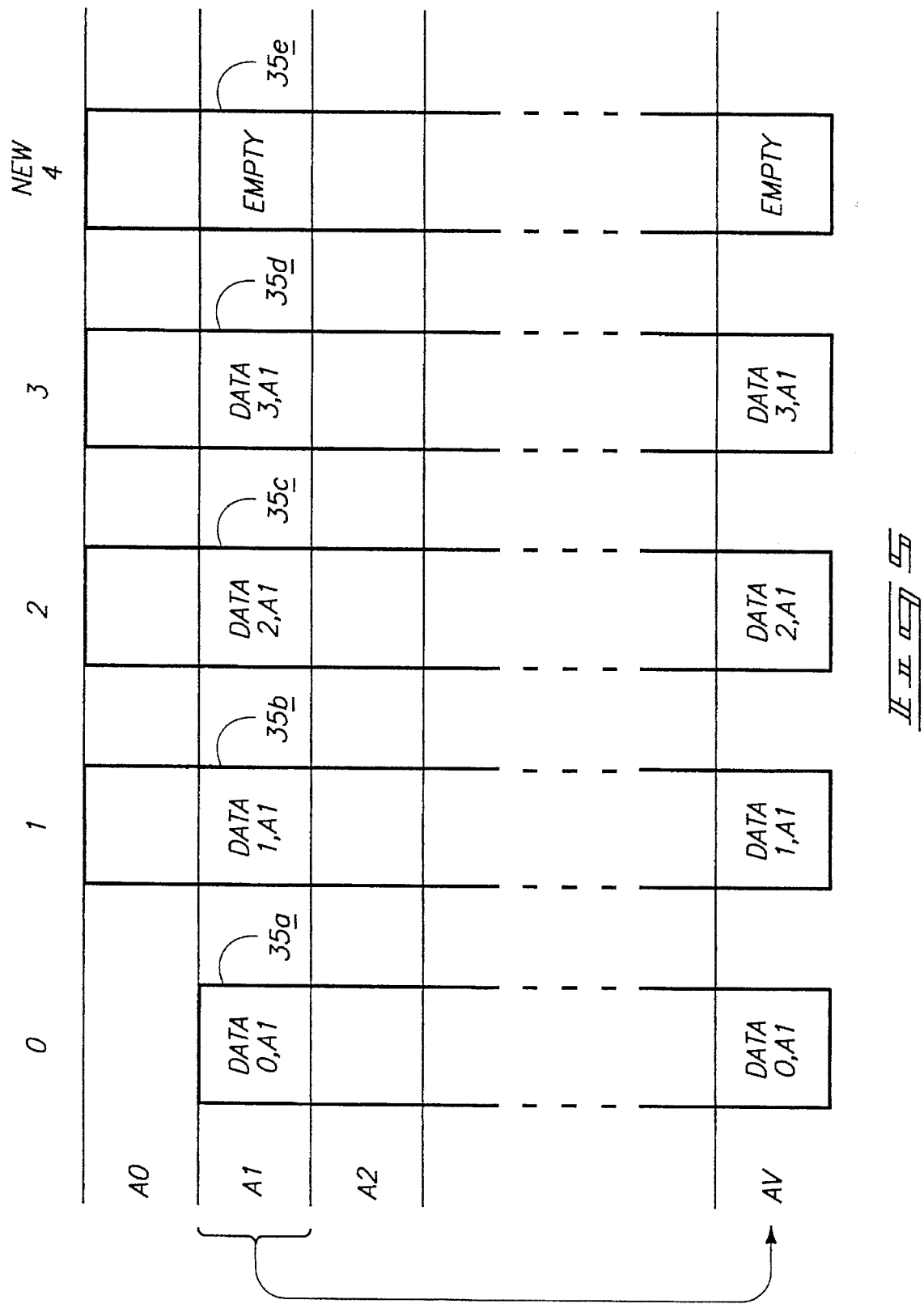
FIG. 5 is a diagrammatic illustration of storage space on multiple storage disks and demonstrates moving data from an entire RAID area to another storage space so that the original RAID area can be expanded to include space on a new disk.
Figure 6:
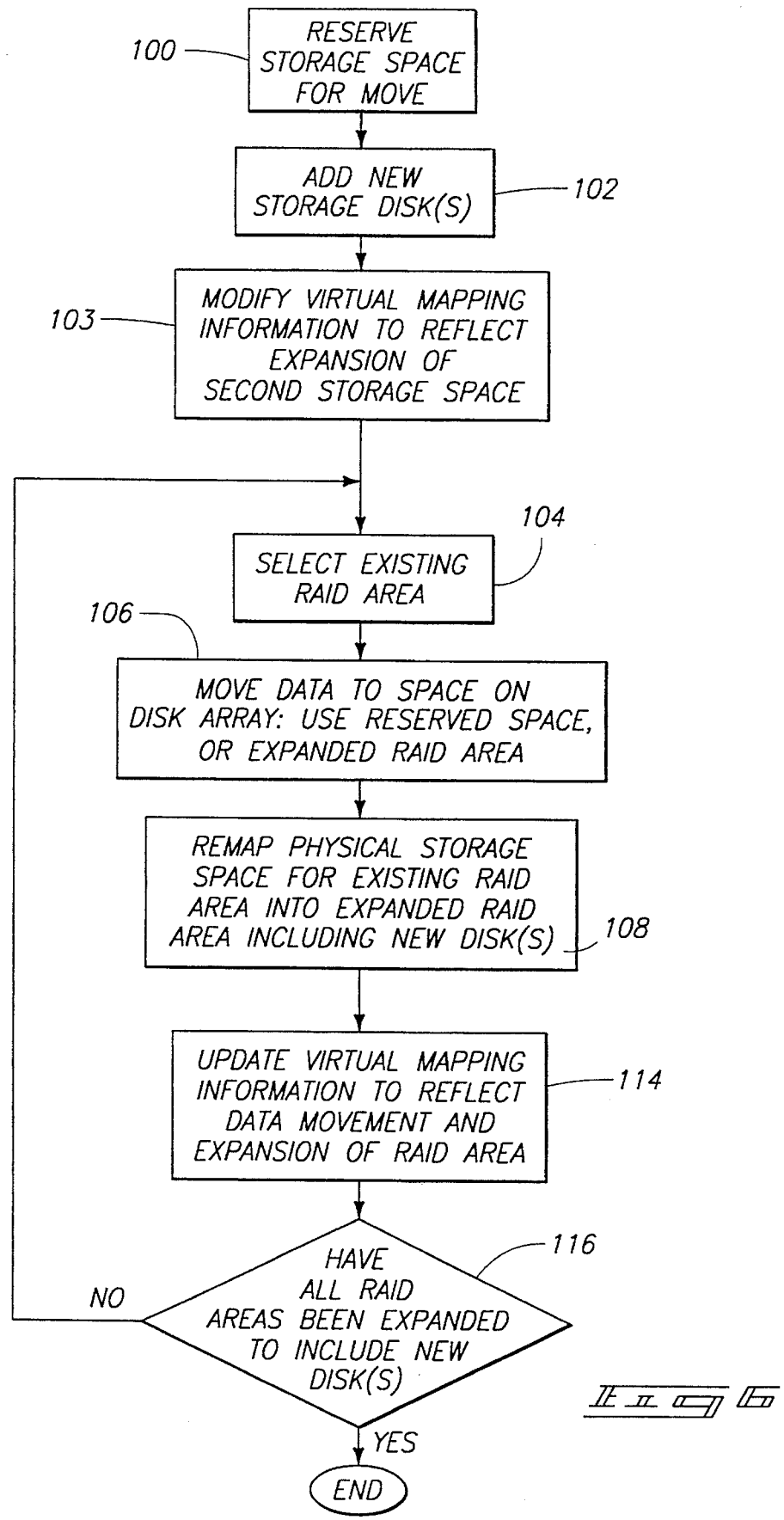
FIG. 6 is a flow diagram showing the methodical steps associated with enlarging storage capacity by adding new disks, while maintaining data availability, according to one preferred embodiment.

FIGS. 5 and 6 show one method according to this invention where entire RAID areas are reconfigured one at a time to incorporate the new storage disk(s). In FIG. 5, a new additional disk, referenced by numeral 4, is added to the disk array. More than one storage disk can be added; but for simplicity of explanation, only one disk is added in this example. The new disk is initially empty. The new disk can have the is same or different capacity than other existing storage disks in the disk array.

With reference to FIG. 6, one possible initial step 100 is to reserve storage space on the presently configured disk array. Preferably, some storage space is always available in the disk array for this and other purposes. For instance, RAID management system 16 reserves space equivalent to one or more RAID areas for the purpose of data migration between RAID areas as described above with reference to FIG. 4. The size of the reserved space is not calculated as part of the capacity available for user data to ensure that the system has space for moving data between storage areas. This is done by setting a threshold condition in the controller that inhibits or blocks use of the reserved space for any purpose other than data movement or migration.

The space reserved for use during the processes of adding new storage disks can be managed as part of the normal tasks of RAID management system 16, or by controller 14, or in other ways. The reserved space has a capacity equal to or greater than that of an existing RAID area. In this manner, the reserved space has a size sufficient to hold at least the same amount of data as that stored in a RAID area. Space reservation can be represented in the first or RAID virtual view, the second or user virtual view, or a combination of both.

At step 102, one or more storage disks are added to the disk array, such as disk 4 in FIG. 5. At step 103, the second virtual storage space 50 is modified to reflect the new storage space yielded by addition of the storage disk(s). The host therefore immediately recognizes that more space has been added to the data storage system. However, the host may experience a delay from initial access to the new disk space until sufficient space to accommodate a host request has been incorporated via the following RAID area expansion techniques.

At step 104, an existing RAID area is selected. An existing RAID area is one which presently contains data, but has not yet been configured to incorporate the space on new disk 4. At step 106, all of the data contained in the selected RAID area is moved to one of the following two places: (1) an already expanded RAID area which includes the new disk space, or (2) other space on the storage disk array which includes the space that was reserved in step 100. FIG. 5 shows the movement of data from selected area A1 (which corresponds to a RAID area 42 in the RAID virtual view; see FIG. 4) to reserved space in area AV. The reserved storage space is shown as being contained in a contiguous physical area AV which is mapped into a single contiguous RAID area for purposes of explanation. However, the reserved storage space will typically be distributed throughout the disk array in a non-contiguous manner and mapped into multiple RAID areas.

The physical storage space corresponding to the selected area A1 is then remapped or reconfigured to include the new storage disk 4 (step 108). This remapping creates an expanded RAID area which spans across the multiple storage disks 0-3 and the new additional storage disk 4. The expanded RAID area includes an equal sized region (made up of multiple equal sized segments) from every disk in the array (i.e., regions 35a–35d), including the new disk (i.e., region 35e). Remapping existing RAID areas into expanded RAID areas (steps 104–108) can be conducted in a background process during idle times of the data storage system.

Storage space that has not yet been designated in the RAID regime automatically grows to include the new disk capacity. This space is is converted to a RAID area as needed. In the event that additional expanded RAID areas are required to facilitate a user's storage request, unused storage space is located and then mapped into an expanded RAID area that includes the new disk space. It is noted that this newly expanded RAID area can be used to receive data from existing RAID areas per step 106.

Upon completion of this data movement, the memory map information in memory map store 21 for both the first and second virtual storage spaces is updated to reflect the data movement and expansion of RAID area within the hierarchic disk array at step 114. More specifically, the memory map information is updated as the data in each virtual block is moved during the expansion process. The process continues to index through the disk array storage system one RAID area at a time until all RAID areas have been expanded to include the new disk space (step 116). According to the methods of this invention, the data remains available to the user at all times.

RAID management system 16 resolves any conflicts arising during the process at the second virtual storage space layer 50. More particularly, RAID management system 16 resolves conflicts between data access requests to the virtual blocks and the movement of the virtual blocks. The conflict resolution allows data to remain available at all times. The RAID management system manages conflicts through a variety of techniques. One example technique is to temporarily suspend access to the virtual blocks associated with the selected RAID area. Another technique, known as "non-preemption", exploits uninterrupted use of a system resource to avoid any conflicting activity. Conflicts are prevented from arising because the resource is dedicated to only one task at a time. Still another example technique is to log any conflicting is activity resulting from trying to access data that is being moved, and later going back to resolve that conflict once the data is moved.

This method can be generalized to a non-RAID environment. The physical storage space of the disk array is configured into multiple stripes, such as stripes 0–Q in FIGS. 3 and 4, instead of RAID areas. The stripes extend across all of the disks and typically include a single segment from each disk, although stripes with more than one segment per disk are possible. A portion of physical space may or may not be reserved to temporarily store data held in the stripe. If so, the portion of space is of sufficient size to store an equal or greater amount of data stored in a stripe.

A stripe is selected for expansion and allocation in that stripe is inhibited. All of the data in the selected stripe is moved to another storage location in the disk array. The physical storage space containing the stripe is then reconfigured into an expanded stripe for storing data that includes the segment on the new storage disk. The expanded stripe thus spans across all storage disks, including the new additional storage disks. Allocation in the expanded stripe is then resumed. This process s is continued stripe-by-stripe until all stripes have been configured to include the new disks. Data availability to all non-selected stripes is maintained during the process.

FIGS. 7–13 show another preferred method according to this invention where segments are reorganized and packed within a stripe during the reconfiguration process. Unlike the method described above, data is initially moved within the selected stripe, and not to a new location outside of the selected stripe. Additionally, with this method, on-line reconfiguration can be conducted without reserving space on the existing storage array.

FIGS. 7–12 illustrate the process on a disk array that initially consists of four disks 0–3. The physical storage space of the disk array is configured into multiple stripes for storing a predetermined amount of data (step 200 in FIG. 13). Each stripe extends across, and includes a segment from, each storage disk 0—3. Each stripe contains data and redundant parity information P.

A pre-map representing the stripe configuration or memory layout of the physical storage space and the data stored therein is generated and maintained by the data storage system (step 202). The pre-map can be embodied as tables maintained and updated in the memory map store 21 in disk array controller 14 (FIG. 1). Alternatively, the pre-map can comprise a set of arithmetic equations designed into the RAID management system 16. These equations derive mapping information based upon the number of storage disks in the disk array.

A new additional disk 4 is then added to the disk array (step 204). The new disk is initially empty. The RAID management system 16 creates a post-map representing a new stripe configuration or memory layout of the physical storage space of the disk array after incorporating the additional storage disk 4 (step 206). This post-map can be similarly kept as a table in memory map store 21. Alternatively, the post-map can be generated by the arithmetic equations given the parameter of the new number of disks now configured in the disk array.

At step 208, a group A of segments is defined. Preferably, group A consists of one expanded stripe that has a segment from every storage disk, including the new additional storage disk. In FIG. 7, group A consists of segments 0, 1, 2, P, and new segment N in disk 4. Next, a group B of segments is defined (step 210). Group B includes segments not found in group A. Group B preferably consists of enough is segments to fill one expanded stripe. In the example of FIGS. 7–12, group B is initially the same size of group A, including segments from a single expanded stripe. Later in the process, however, group B is enlarged to include segments from two expanded stripes. Accordingly, the segments in group B may or may not be in the same physical stripe. Following definition of groups A and B, the RAID management system begins managing for conflicts that might arise during the expansion process.

At the beginning of the process, data in the segments of group A might need to be reorganized from a first data arrangement in the segments according to the pre-map to a second data arrangement in the segments according to the post-map (step 213). That is, the data arranged under the pre-map is evaluated against the post-map to determine whether the data remains in the same place after expansion or needs to be reorganized. After several iterations in the process, however, group A will consist entirely of empty segments and thus, there is no data to reorganize.

Accordingly, at decision step 211, it is determined whether all segments in group A are empty. If so, the reorganization step is not performed and data is simply moved from the segments in group B into the empty segments in group A. Conversely, if the segments are empty, the next decision step 212 determines whether the data is presently in its proper order in view of the post-map configuration. If so, the reorganization step is again avoided. On the other hand, if the data is out of order, the reorganization step 21 3 is conducted. These steps are more fully described below with reference to the example depicted in FIGS. 7–12.

Assume for this example that the pre-map exhibited a data is configuration on disks 0–3 as shown in FIG. 7. Further assume that the post-map contained a storage configuration incorporating new disk 4 such as that shown in FIG. 11.

Notice that the data in the group A segments of FIG. 7 are already in the desired order. No reorganization is necessary. Instead, data from segment 3 of group B is simply moved to fill segment P in group A that had previously held parity information. Working through the flow diagram of FIG. 13, decision step 211 returns a "no" indicating that the segments in group A are not empty and decision step 212 returns a "yes" indicating that the data is in proper order. Thus, the reorganization step 213 is bypassed and flow continues directly to step 214 where data from a segment in group B is moved to fill an empty segment in group A. At step 216, parity information for the data in the segments of group A is regenerated and placed in the new segment N on new disk 4. Any conflicts regarding the virtual blocks associated with the segments in groups A and B that arose during this process are then resolved.

In FIG. 8, group A is redefined to include a vacated segment V, a data segment 4, a parity segment P, a data segment 5, and a new segment N on respective disks 0–4 (step 208). Group B is also redefined to include segments 6, P, 7, 8, and N on respective disks 0–4. Notice that the data in the group A segments is not in proper order and thus is reorganized under step 213. The data in segment 4 is moved from disk 1 to the vacated segment V on disk 0 and subsequently, the data in segment 5 is moved from disk 3 to the now vacated segment on disk 1.

It is noted that data could also be shifted to the new segment N on disk 4 within the group A during reorganization. For instance, if the post-map dictated, data could be moved from segment 4 is in group A to unused new segment N on the additional storage disk 4.

After the data is reorganized within group A at step 213, data is moved from group B to fill the empty segments. As used herein, "empty" segments mean segments that have been vacated (designated by a V), segments that previously stored parity information (designated by a P), and new segments provided by the new disk (designated by an N). In FIG. 8, data in segment 6 on disk 0 is moved to fill empty segment P on disk 2; and data in segment 7 on disk 2 is moved to fill the new segment N on disk 4. The parity information is regenerated and placed in the vacated segment on disk 3. Again, any conflicts regarding the virtual blocks associated with the segments in groups A and B are resolved.

FIG. 9 shows the third iteration through the flow diagram of FIG. 13 where groups A and B are redefined to cover the third and fourth stripes, respectively. This iteration once again uses a combination of data reorganization within group A and data packing or filling with data provided from group B. The parity information is regenerated for the new data set and stored in the segment on disk 2.

FIG. 10 shows the fourth iteration. Group A is redefined to cover the segments in the fourth stripe. Notice that group A now contains all empty segments. There is no data to reorganize within group A. Accordingly, step 211 in the FIG. 13 flow diagram bypasses the reorganize step 213 and proceeds directly to the filling step 214. The reorganization subprocess is therefore only conducted at the beginning and is quickly discontinued after only a few iterations. In fact, the reorganization step will cease after the N−1 iteration, where N equals the number of storage disks in the array prior to adding the new disk(s). In this example, N equals four, and thus, the reorganization subprocess is discontinued after the third iteration.

Group B is redefined and enlarged to cover the segments in the fifth and sixth stripes. The enlargement occurs because more data is used to fill all empty segments in group A than can be accommodated by a single stripe.

FIG. 11 illustrates the seventh iteration. At this iteration, a gap of unused segments begins to form between groups A and B. This gap evolves because data is being moved from a smaller storage space in group B and below into a larger expanded space above group A. The gap begins to form at the 2N−1 iteration, where N is the number of storage disks in the array prior to adding the new disk(s). The gap grows as the process continues.

The process concludes when group B reaches the bottom of the disk array storage space. At that point, the gap has grown to its largest size and contains all available unused segments. Additionally, all unused segments are located beneath the used segments in the disk array. This is advantageous as it facilitates use of the arithmetic equations (if implemented for mapping) because the equations can now be loaded with the new number of disks in the disk storage array.

FIG. 12 illustrates the general case of the process after many iterations. Data is packed in segments G, G−1, G−2, G−3, etc. above group A to include the new storage space on disk 4. Data in and below group B, on the other hand, remains in the segments H, H+1, H+2, etc. as it existed prior to adding the new disk. The segments on new disk 4 are empty. Group A consists of entirely empty segments. Group B consists of data to be filled into group A. The gap between groups A and B contains many empty segments E.

The process is continued stripe-by-stripe until all stripes is have been expanded to include the new disk space. Thereafter, the maximum space available to the host is increased to reflect expansion resulting from adding the new disk(s). The above method can also be used in the hierarchic disk array having various RAID areas. In this case, regions within RAID areas are reorganized within a selected RAID area and subsequently packed with data from regions outside of the selected RAID area according to the above techniques. Such regions may be handled in bulk, but preferably are separated into their multiple stripes so that the stripes within each RAID area are enlarged stripe-by-stripe until the entire RAID area is completed in the manner described above with reference to FIG. 10.

The methods of this invention are advantageous because they permit hot plug of additional storage disks to enlarge storage capacity while maintaining the availability of the data. By reconfiguring the new space area-by-area, the data can remain resident and accessible on the disk array and does not need to be transferred to another separate storage device as is done in prior art methods.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for enlarging storage capacity in a data storage system; the data storage system having a disk array of multiple storage disks, the storage disks defining a physical storage space; the method comprising the following steps:

(a) configuring the physical storage space of the disk array into multiple stripes for storing a predetermined amount of data, individual stripes extending across multiple storage disks in the disk array and comprising a segment from individual storage disks in the disk array;

(b) reserving a portion of the physical storage space in the disk array of sufficient size store at least an amount of data stored in an individual stripe;

(c) adding at least one additional storage disk to the disk array;

(d) selecting a stripe;

(e) moving all segments from the selected stripe to the reserved portion; and (f) reconfiguring the physical storage space containing the selected stripe into an expanded stripe for storing data, the expanded stripe spanning across the multiple storage disks and the new additional storage disk, the expanded stripe comprising a segment from the individual storage disks and a segment from the new additional storage disk.

2. A method according to claim 1 further comprising the additional step of repeating steps (d)–(f) until all stripes in the disk array have been expanded to include segments on the new additional storage disk.

3. A method according to claim 1 further comprising inhibiting allocation in the selected stripe.

4. A method for enlarging storage capacity in a data storage system; the data storage system having a hierarchic disk array of multiple storage disks, the storage disks defining a physical storage space; the method comprising the following steps:

(a) mapping the physical storage space into a first virtual storage space which presents the physical storage space as multiple RAID areas, the RAID areas including first and second RAID areas where the first RAID area stores data according to a first RAID level and the second RAID area stores data according to a second RAID level, the first and second RAID areas extending across all storage disks in the disk array and comprising one or more segments of storage space from individual storage disks in the disk array;

(b) mapping the first virtual storage space into a second virtual storage space which presents storage space as multiple virtual blocks;

(c) adding at least one additional storage disk to the hierarchic disk array to enlarge the physical storage space of the data storage system;

(d) modifying available capacity for the second virtual storage space to reflect the new storage space yielded by adding the new additional storage disk;

(e) expanding unused storage space which has not been mapped to a RAID area per step (a) to include space on the additional storage disk;

(f) selecting a RAID area;

(g) moving data from the selected RAID area to another location on the hierarchic disk array;

(h) updating the mapping of the second virtual storage space to the first virtual storage space to reflect the data movement within the hierarchic disk array;

(i) remapping the physical storage space corresponding to the selected RAID area into at least one expanded RAID area, the expanded RAID area spanning across all of the storage disks and the new additional storage disk, the expanded RAID area comprising one or more segments from the individual storage disks and from the new additional storage disk; and (j) repeating steps ((f)–(i)) until all RAID areas in the hierarchic disk array have been expanded to include segments on the new additional storage disk.

5. A method according to claim 4 further comprising resolving conflicts between access to the data in the selected RAID area and movement of that data.

6. A method according to claim 4 further comprising reserving at least one reserved area of a size sufficient to hold an amount of data as the stored in a RAID area; and the moving data step (g) comprises moving the data from the selected RAID area to the reserved area.

7. A method according to claim 4 further comprising the following steps:

locating unused storage space; and mapping the unused storage space into at least one expanded RAID area.

8. A method for enlarging storage capacity in a data storage system; the data storage system having a disk array of multiple storage disks, the storage disks defining a physical storage space; the method comprising the following steps:

(a) configuring the physical storage space of the disk array into multiple stripes for storing a predetermined amount of data, individual stripes extending across multiple storage disks in the disk array and comprising a segment from individual storage disks in the disk array;

(b) adding at least one additional storage disk to the disk array;

(c) selecting a segment in a stripe;

(d) suspending access to the selected segment while allowing access to non-selected segments in the stripe;

(e) moving data from the selected segment to another location on the disk array;

(f) repeating steps (d) and (e) for all segments in the stripe; and (g) reconfiguring the physical storage space containing the stripe into an expanded stripe for storing data, the expanded stripe spanning across the multiple storage disks and the new additional storage disk, the expanded stripe comprising a segment from the individual storage disks and a segment from the new additional storage disk.

* * * * *